US008578185B2

(12) United States Patent
Azuma et al.

(10) Patent No.: US 8,578,185 B2
(45) Date of Patent: Nov. 5, 2013

(54) POWER SUPPLY CONTROL DEVICE, IMAGE PROCESSING APPARATUS, POWER SUPPLY CONTROL METHOD AND COMPUTER READABLE MEDIUM FOR CONTROLLING POWER SUPPLY

(75) Inventors: Kouichi Azuma, Kanagawa (JP); Kazuhiko Narushima, Kanagawa (JP); Mitsunobu Mamiya, Kanagawa (JP); Hidenori Horie, Kanagawa (JP); Motofumi Baba, Kanagawa (JP); Masafumi Ono, Kanagawa (JP); Kenji Kuroishi, Kanagawa (JP); Masato Ishiyama, Kanagawa (JP); Keiko Shiraishi, Kanagawa (JP); Kenta Ogata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 167 days.

(21) Appl. No.: 13/163,348

(22) Filed: Jun. 17, 2011

(65) Prior Publication Data

US 2012/0137154 A1 May 31, 2012

(30) Foreign Application Priority Data

Nov. 30, 2010 (JP) ................................ 2010-267322

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | | |
|---|---|---|---|---|
| 7,471,334 | B1 * | 12/2008 | Stenger | 348/373 |
| 8,254,796 | B2 * | 8/2012 | Oyoshi | 399/29 |
| 8,254,800 | B2 * | 8/2012 | Oyoshi | 399/79 |
| 8,321,171 | B2 * | 11/2012 | Borean et al. | 702/142 |
| 2008/0225018 | A1 * | 9/2008 | Pang | 345/179 |
| 2010/0129100 | A1 * | 5/2010 | Oyoshi | 399/53 |
| 2010/0150600 | A1 * | 6/2010 | Oyoshi | 399/88 |
| 2010/0156790 | A1 * | 6/2010 | Su et al. | 345/163 |
| 2012/0296602 | A1 * | 11/2012 | Oyoshi | 702/150 |

FOREIGN PATENT DOCUMENTS

| | | |
|---|---|---|
| JP | 05-045471 A | 2/1993 |
| JP | 2003-255776 A | 9/2003 |
| JP | 2010147725 A | 7/2010 |

OTHER PUBLICATIONS

Communication from Japanese Patent Office dated Jun. 19, 2012 in corresponding Japanese Application No. 2010-267322.

* cited by examiner

*Primary Examiner* — M Elamin
(74) *Attorney, Agent, or Firm* — Sughrue Mion, PLLC

(57) ABSTRACT

A power supply control device includes a power supply controller that selectively performs a power supply mode and a power saving mode, a detector that detects a moving body in a predetermined range in the vicinity of the processor, a power supply mode change instruction unit that changes an operation mode from the power saving mode to the power supply mode when the detector detects the moving body, an information history unit that acquires information related to an operation for the processor in the power supply mode, and a sensitivity adjusting unit that adjusts a detection sensitivity of the detector for the moving body on the basis of the information acquired by the information history unit for a period from a change of the operation mode from the power saving mode to the power supply mode to a change of the operation mode to a next power saving mode.

6 Claims, 9 Drawing Sheets

POWER SUPPLY CONTROL DEVICE, IMAGE PROCESSING APPARATUS, POWER SUPPLY CONTROL METHOD AND COMPUTER READABLE MEDIUM FOR CONTROLLING POWER SUPPLY

CROSS-REFERENCE TO RELATED APPLICATION

This application is based on and claims priority under 35 USC 119 from Japanese Patent Application No. 2010-267322 filed on Nov. 30, 2010.

BACKGROUND

1. Technical Field

The present invention relates to a power supply control device, an image processing apparatus, a power supply control method and a computer readable medium for controlling power supply.

SUMMARY

According to an aspect of the invention, there is provided a power supply control device including:

a power supply controller that selectively performs a power supply mode that receives power from a mains power source and supplies power to a processor which is operated by the power and a power saving mode that stops the supply of power to the processor;

a detector that detects a moving body in a predetermined range in the vicinity of the processor;

a power supply mode change instruction unit that controls the power supply controller to change an operation mode from the power saving mode to the power supply mode when the detector detects the moving body;

an information history unit that acquires information related to an operation for the processor in the power supply mode; and a sensitivity adjusting unit that adjusts a detection sensitivity of the detector for the moving body on the basis of the information acquired by the information history unit for a period from a change of the operation mode from the power saving mode to the power supply mode to a change of the operation mode to a next power saving mode.

BRIEF DESCRIPTION OF THE DRAWINGS

Exemplary embodiments of the present invention will be described in detail based on the following figures, wherein.

DETAILED DESCRIPTION

Figure 1:
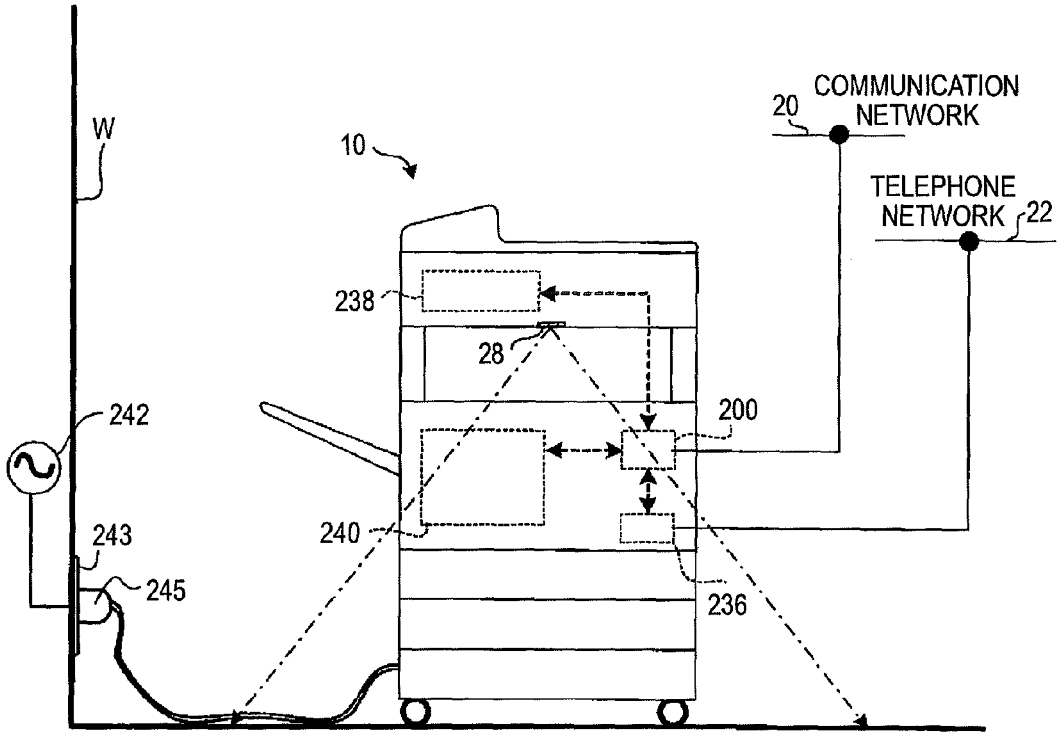
FIG. 1 is a diagram schematically illustrating an image processing apparatus according to an exemplary embodiment of the invention.

FIG. 1 shows an image processing apparatus 10 according to an exemplary embodiment. The image processing apparatus 10 includes an image forming unit 240 that forms images on a recording sheet, an image reading unit 238 that reads a document image, and a facsimile communication control circuit 236. The image processing apparatus 10 includes a main controller 200 and controls the image forming unit 240, the image reading unit 238, and the facsimile communication control circuit 236 to primarily store the image data of the document image read by the image reading unit 238 or transmit the read image data to the image forming unit 240 or the facsimile communication control circuit 236.

A communication network 20, such as the Internet, is connected to the main controller 200 and a telephone network 22 is connected to the facsimile communication control circuit 236. The main controller 200 is connected to a host computer through, for example, the communication network 20 and has a function of receiving image data or a function of receiving and transmitting a facsimile through the facsimile communication control circuit 236 using the telephone network 22.

The image forming unit 240 includes photoconductors. A charging device that uniformly charges the photoconductor, a scanning/exposure unit that emits a light beam on the basis of image data, an image developing unit that develops an electrostatic latent image which is formed by scanning and exposure by the scanning/exposure unit, a transfer unit that transfers a visible image formed on the photoconductor to a recording sheet, and a cleaning unit that cleans the surface of the photoconductor after transfer are provided in the vicinity of the photoconductor. A fixing unit that fixes the transferred image on the recording sheet is provided on a transport path of the recording sheet.

The image reading unit 238 includes platen glass on which a document is positioned, a scanning driving system that emits light to scan the image of the document placed on the platen glass, and a photoelectric conversion element, such as a CCD, that receives light which is reflected from or passes through the document by the scanning of the scanning driving system and converts the light into an electric signal.

In the image processing apparatus 10, a plug 245 is attached to the leading end of an input power supply line 244. The plug 245 is inserted into a wiring plate 243 of a mains power source 242 that is wired to a wall W to receive power.

Figure 2:
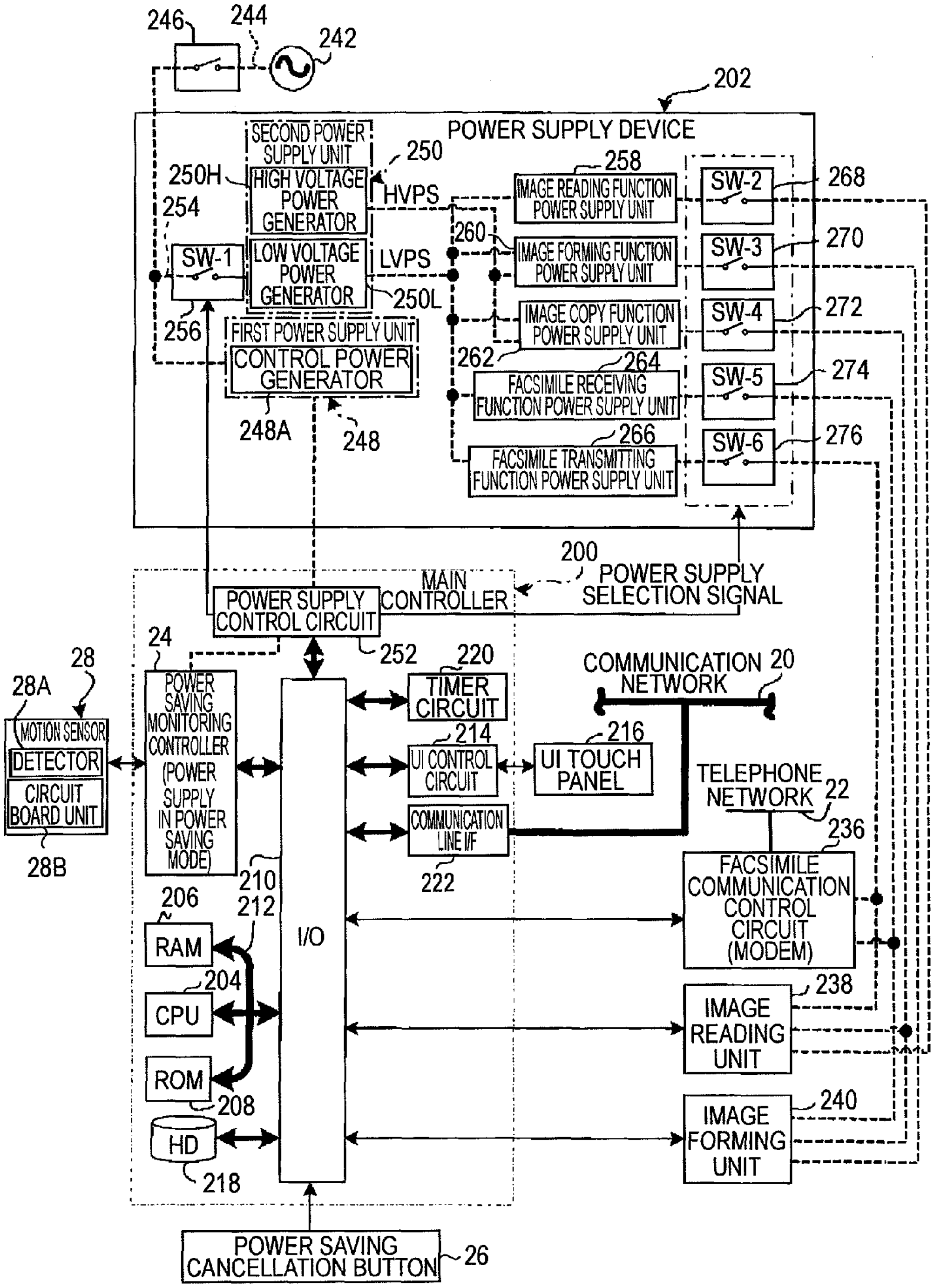
FIG. 2 is a diagram schematically illustrating the structure of a main controller and a power supply device according to this exemplary embodiment.

FIG. 2 is a diagram schematically illustrating the main structure of devices that are controlled by the main controller 200, the main controller 200, and the power supply line of a power supply device 202 that supplies power to each device.

(Main Controller 200)

As shown in FIG. 2, the main controller 200 includes a CPU 204, a RAM 206, a ROM 208, an I/O (input/output unit) 210, and a bus 212, such as a data bus or a control bus, for connecting the components. A UI touch panel 216 is connected to the I/O 210 through a UI control circuit 214. A hard disk (HDD) 218 is connected to the I/O 210. The CPU 204 is operated on the basis of programs stored in, for example, the ROM 208 or the hard disk 218, to implement the functions of the main controller 200. A program may be installed from a storage medium (for example, a CD-ROM or a DVD-ROM) that stores programs and the CPU 204 may be operated on the basis of the program to implement an image processing function.

A timer circuit 220 and a communication line I/F 222 are connected to the I/O 210. In addition, devices, such as a facsimile communication control circuit (MODEM) 236, an image reading unit 238, and an image forming unit 240, are connected to the I/O 210.

The timer circuit 220 measures the initial setting time in order to operate the facsimile communication control circuit 236, the image reading unit 238, and the image forming unit 240 in the power saving mode (in which power is not supplied).

The main controller 200 and each device (the facsimile communication control circuit 236, the image reading unit 238, and the image forming unit 240) are supplied with power from the power supply device 202 (see a dotted line in FIG. 2). FIG. 2 shows one power supply line (dotted line). However, in practice, two or three power supply lines are provided.

(Power Supply Device 202)

As shown in FIG. 2, the input power supply line 244 extending from the mains power source 242 is connected to a main switch 246. When the main switch 246 is turned on, power can be supplied to a first power supply unit 248 and a second power supply unit 250.

The first power supply unit 248 includes a control power generator 248A and is connected to a power supply control circuit 252 of the main controller 200. The power supply control circuit 252 supplies power to the main controller 200, is connected to the I/O 210, and performs switching control for turning on or off the connection of the power supply line to each device (the facsimile communication control circuit 236, the image reading unit 238, and the image forming unit 240) according to a control program of the main controller 200.

A power supply line 254 is connected to the second power supply unit 250 through a first sub-power supply switch 256 (hereinafter, in some cases, referred to as a switch "SW-1"). The turning-on or turning-off of the switch SW-1 is controlled by the power supply control circuit 252.

The second power supply unit 250 includes a high voltage power generator 250H and a low voltage power generator (LVPS) 250L. The high voltage power generator 250H is mainly a power supply that is used in, for example, a heater of the fixing unit in the image forming unit 240. A low voltage is generated from the low voltage power generator 250L.

The high voltage power generator 250H and the low voltage power generator (LVPS) 250L of the second power supply unit 250 are selectively connected to an image reading function power supply unit 258, an image forming function power supply unit 260, an image copy function power supply unit 262, a facsimile receiving function power supply unit 264, and a facsimile transmitting function power supply unit 266.

The image reading function power supply unit 258 receives a voltage from the low voltage power generator (LVPS) 250L and is connected to the image reading unit 238 through a second sub-power supply switch 268 (hereinafter, in some cases, referred to as a switch "SW-2").

The image forming function power supply unit 260 receives a voltage from the high voltage power generator 250H and the low voltage power generator (LVPS) 250L and is connected to the image forming unit 240 through a third sub-power supply switch 270 (hereinafter, in some cases, referred to as a switch "SW-3").

The image copy function power supply unit 262 receives a voltage from the high voltage power generator 250H and the low voltage power generator (LVPS) 250L and is connected to the image reading unit 238 and the image forming unit 240 through a fourth sub-power supply switch 272 (hereinafter, in some cases, referred to as a switch "SW-4").

The facsimile receiving function power supply unit 264 receives a voltage from the high voltage power generator 250H and the low voltage power generator (LVPS) 250L and is connected to the facsimile communication control circuit 236 and the image forming unit 240 through a fifth sub-power supply switch 274 (hereinafter, in some cases, referred to as a switch "SW-5").

The facsimile transmitting function power supply unit 266 receives a voltage from the low voltage power generator (LVPS) 250L and is connected to the facsimile communication control circuit 236 and the image reading unit 238 through a sixth sub-power supply switch 276 (hereinafter, in some cases, referred to as a switch "SW-6") (except for an output, such as a communication report).

The turning-on or turning-off of each of the second sub-power supply switch 268, the third sub-power supply switch 270, the fourth sub-power supply switch 272, the fifth sub-power supply switch 274, and the sixth sub-power supply switch 276 is controlled on the basis of power supply selection signals from the power supply control circuit 252 of the main controller 200, similarly to the first sub-power supply switch 256.

In the above-mentioned structure, power is supplied to each device (the facsimile communication control circuit 236, the image reading unit 238, and the image forming unit 240) which has been selected according to the functions, but is not supplied to the device that is not necessary for the instructed function. Therefore, it is possible to supply the minimum necessary power.

(Monitoring During Power Saving)

In some cases, some of the functions of the main controller 200 according to this exemplary embodiment are stopped in order to minimize power consumption. Alternatively, in some cases, the supply of power to most of the main controller 200 is stopped. These are collectively called a "power saving mode".

For example, the power saving mode may be performed by starting the timer at the time when image processing ends. That is, the supply of power is stopped by counting a predetermined period of time after the timer starts. When there is any operation (for example, the operation of a hard key including a power saving cancellation button 26) before the elapse of a predetermined period of time, the counting of the timer in the power saving mode is stopped and the timer starts after the next image processing ends.

In the power saving mode, in general, as an element that receives power, a power saving monitoring controller 24 is connected to the I/O 210. The power saving monitoring controller 24 may be, for example, an IC chip, which is called an ASIC that stores an operation program and includes, for example, a CPU, a RAM, and a ROM processed by the operation program.

However, it is premised that, during monitoring in the power saving mode, for example, when a UI touch panel 216 or a so-called hard key (for example, operation buttons for instructing a copying function and a facsimile function) is operated and the power saving monitoring controller 24 controls the first sub-power supply switch 256, the second sub-power supply switch 268, the third sub-power supply switch 270, the fourth sub-power supply switch 272, the fifth sub-power supply switch 274, and the sixth sub-power supply switch 276 in the device which is in the power saving mode, power is supplied.

The power saving cancellation button 26 is connected to the I/O 210 of the main controller 200. In the power saving mode, the user can operate the power saving cancellation button 26 to cancel the power saving mode.

It is premised that power is supplied to, for example, the UI touch panel 216 of the main controller 200 except for the power saving monitoring controller 24 in order to monitor the operation of the UI touch panel 216 or the operation of a so-called hard key (including the power saving cancellation button 26).

Therefore, in the power saving mode, the minimum power that is necessary for an input system, such as the UI touch panel 216, is supplied.

In some cases, when the user stands in front of the image processing apparatus 10 and operates the power saving cancellation button 26 to resume the supply of power, it takes time until the image processing apparatus 10 starts up.

In this exemplary embodiment, for a reduction in the amount of power supplied to the main controller 200 by a monitoring system in the power saving mode, in order to reduce the amount of power supplied to the main controller 200, a motion sensor 28 is provided in the power saving monitoring controller 24 and the supply of power to components other than the motion sensor 28 and the power saving monitoring controller 24 is cut in the power saving mode.

The motion sensor 28 includes a detector 28A and a circuit board unit 28B. The circuit board unit 28B adjusts the sensitivity of the signal detected by the detector 28A or generates an output signal.

In the motion sensor 28, the term "motion detection" is a proper noun based on this exemplary embodiment and may include the detection (sensing) of the motion of a person. That is, the "motion detection" includes the detection (sensing) of the motion of moving bodies other than a person. Therefore, in the following description, in some cases, a "person" is detected by the motion sensor. However, in the future, for example, the motion of robots operated instead of persons will be detected by the motion sensor. Conversely, when there is a specific sensor that can specify and detect a person, the specific sensor can be applied.

The motion sensor 28 has specifications capable of detecting the motion of a person in the vicinity of the image processing apparatus 10. In this case, for example, an infrared sensor using the pyroelectric effect of a pyroelectric element is a representative example.

The most significant characteristic of the sensor using the pyroelectric effect of the pyroelectric element is a wide detection region. In addition, given that the sensor detects motion if a person stands still in the detection region, the motion sensor does not detect the existence of the person. For example, when the person is moving, a high-level signal is output. When the person stops in the detection range, the signal is changed to a low-level signal.

The "stopping" in this exemplary embodiment includes the completely stopped state of an object, such as a still image captured by, for example, a still camera, and a state in which the person stands still in front of the image processing apparatus 10 in order to operate the image processing apparatus 10. That is, the range of the "stopping" includes the very small amount of motion of the person in a predetermined range and the movement of the hands, feet, and head of the person.

The sensitivity of the motion sensor 28 maybe relatively roughly and normally adjusted, instead of defining the "stopping" and adjusting the sensitivity, and the sensitivity may depend on the detection state of the motion sensor 28.

The motion sensor 30 may have specifications capable of detecting whether there is a person (a person is present or absent). A representative example of this sensor is, for example, a reflective sensor including a light emitting unit and a light receiving unit. In addition, the light emitting unit may be separated from the light receiving unit.

The most significant characteristic of the reflective sensor is that the reflective sensor shields or does not shield light incident on the light receiving unit to reliably detect whether there is a person. The detection region of the reflective sensor is a relatively short distance range since the amount of light received by the light receiving unit is limited by, for example, the amount of light emitted from the light emitting unit.

Plural motion sensors 28 may be provided regardless of the specifications.

As described above, the motion sensor 28 provided in the image processing apparatus 10 according to this exemplary embodiment is connected to the power saving monitoring controller 24 such that the signal of the motion sensor 28 is input to the power saving monitoring controller 24.

The power saving monitoring controller 24 determines the approach of the person and determines whether the person has an intention to operate the imaging processing apparatus, on the basis of the signal from the motion sensor 28.

Figure 3:
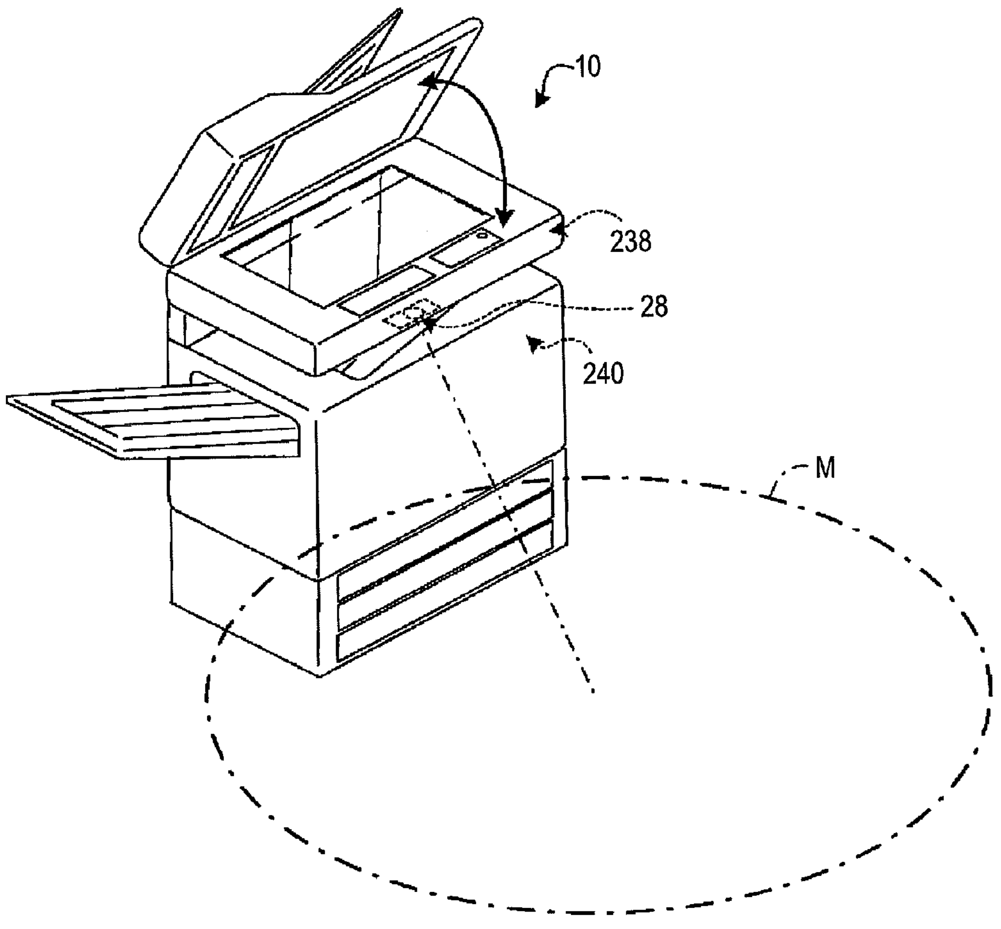
FIG. 3 is a perspective view illustrating the image processing apparatus according to this exemplary embodiment and a region for monitoring a moving body in the vicinity of the image processing apparatus.

As shown in FIG. 3, basically, the motion sensor 28 is fixedly attached to the rear surface, that is, the lower surface of an operation panel which is provided on the front side of the upper surface of the image reading unit 238 of the image processing apparatus 10 in the depth direction.

The detection optical axis of the motion sensor 28 faces the front side of the apparatus where it is predicted that the user will stand in front of the image processing apparatus 10 and operate the image processing apparatus 10 (see a detection region M in FIG. 3). The detection region M may be changed depending on, for example, the attachment position of the motion sensor 28 and the direction of the optical axis of the motion sensor during attachment. For example, the motion sensor 28 may be separated from the image processing apparatus 10 and may be provided on, for example, the ceiling.

However, the detected motion of the person is likely to vary depending on the position where the image processing apparatus 10 is installed. That is, the detected motion of the person varies depending on the environment of the position (for example, an office) where the image processing apparatus 10 is installed. The variation in the detected motion of the person depending on the environment means that the motion of persons (for example, a person who passes by the image processing apparatus 10 and a person who does not approach the image processing apparatus 10) other than the person who actually operates the image processing apparatus 10 is likely to be detected by the motion sensor 28.

In addition, the motion of the person in the vicinity of the image processing apparatus 10 is likely to vary depending on the frequency of use of the image processing apparatus 10.

For example, the ratio of the case in which the person approaches the image processing apparatus 10 in order to operate it to the other cases varies depending on the distance from the image processing apparatus 10.

Therefore, in this exemplary embodiment, it is possible to adjust the sensitivity of the motion sensor 28 on the basis of the installation state of the image processing apparatus 10.

As described above, in the image processing apparatus 10 according to this exemplary embodiment, the timer starts at the time when image processing ends and the operation mode is changed to the power saving mode after a predetermined period of time. Then, when the motion sensor 28 detects that the person gets into the detection region Min the vicinity of the image processing apparatus 10, the operation mode is changed to the power supply mode. This process is repeatedly performed.

However, for the change of the operation mode to the power saving mode, the earlier the operation mode is changed to the power saving mode (the shorter the time required to change the operation mode to the power saving mode by the timer becomes), the better the “energy saving performance” becomes. For the change of the operation mode to the power supply mode, the earlier the operation mode is changed to the power supply mode (the higher the sensitivity of the motion sensor 28 becomes), the more “convenience” is obtained. In other words, a trade-off between the energy saving performance and convenience is established.

Figure 4:
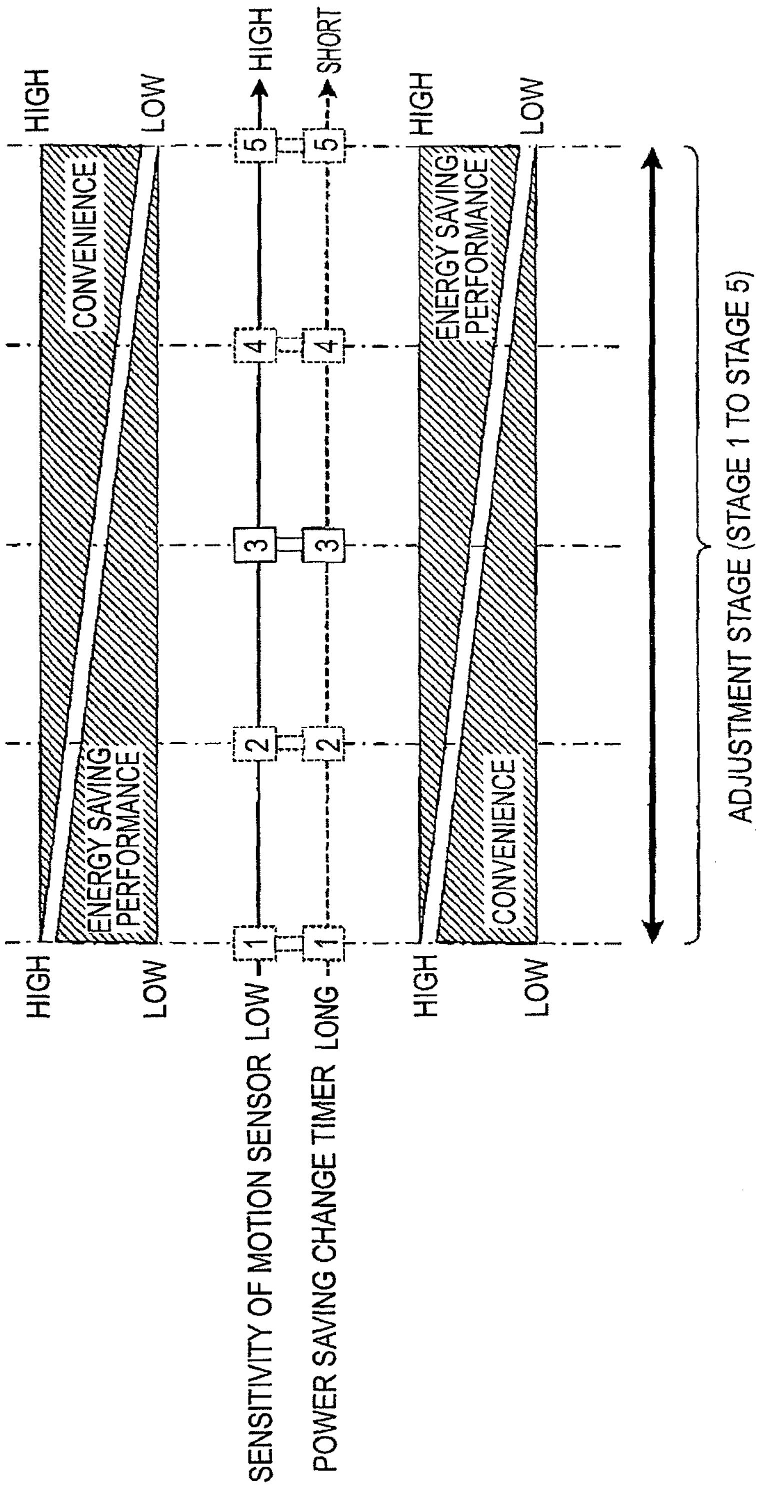
FIG. 4 is a conceptual diagram illustrating the adjustment stages of the sensitivity of a motion sensor and a power saving change timer for achieving both energy saving performance and convenience of the image processing apparatus according to this exemplary embodiment.

In this exemplary embodiment, as shown in FIG. 4, in order to balance “energy saving performance” with “convenience”, indexes for setting the degree of the effect of both energy saving performance and convenience in stages are established.

That is, the main controller 200 (including the power saving monitoring controller 24) of the image processing apparatus 10 specifies stages (stages 1 to 5 in FIG. 4) according to the indexes on the basis of the use conditions of the image processing apparatus 10 and performs control to obtain both “energy saving performance” and “convenience”.

Figure 5:
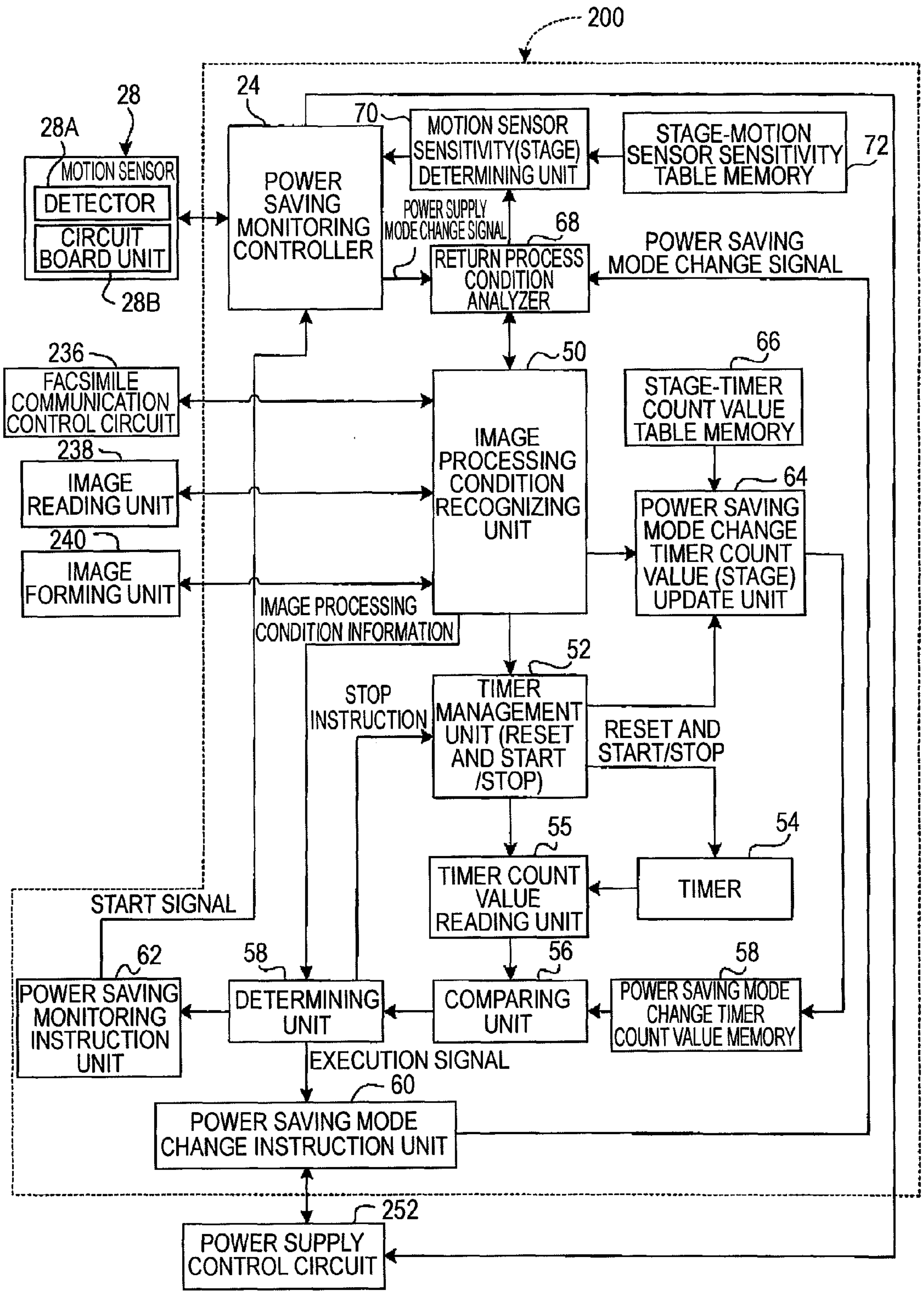
FIG. 5 is a functional block diagram illustrating the adjustment stage control of the sensitivity of the motion sensor and the power saving change timer according to this exemplary embodiment.

FIG. 5 is a functional block diagram illustrating the stage setting control of the sensitivity of the motion sensor 28 and the count value of a power saving mode change timer based on the indexes shown in FIG. 4, which is performed by the main controller 200. FIG. 5 shows the stage setting control according to function, but does not limit the hardware structure of the main controller 200.

When the image processing (job) of the image processing apparatus 10 ends and the next image processing is not performed within a predetermined period of time (power saving mode change timer count value) in the state in which the next job is not scheduled, the operation mode is changed to the power saving mode. An image processing condition recognizing unit 50 recognizes the process conditions of each of the facsimile communication control circuit 236, the image reading unit 238, and the image forming unit 240.

(Control of Power Saving Mode Change Timer)

The image processing condition recognizing unit 50 is connected to a timer management unit 52. A timer 54 is connected to the timer management unit 52 and the timer management unit 52 instructs the resetting, starting, and stopping of the timer.

The timer management unit 52 is connected to a timer count value reading unit 55 and instructs the timer count value reading unit 55 to read a timer count value from the timer 54 that starts to operate in response to reset and start instructions.

The count value read from the timer count value is transmitted to a comparing unit 56. The comparing unit 56 is connected to a power saving mode change timer count value memory 58, receives a power saving mode change timer count value CS, and compares the power saving mode change timer count value CS with a timer count value CT from the timer count value reading unit 55.

The comparison result between the timer count value CT and the power saving mode change timer count value CS by the comparing unit 56 is transmitted to a determining unit 58.

The comparison result of the comparing unit 56 and image processing condition information from the image processing condition memory 50 are input to the determining unit 58.

When the timer count value CT reaches the power saving mode change timer count value CS, the determining unit 58 outputs an execution signal to a power saving mode change instruction unit 60. In order to change the operation mode to the power saving mode, the power saving mode change instruction unit 60 instructs the power supply control circuit 252 to change the operation mode to the power saving mode and starts the power saving monitoring controller 24 through a power saving monitoring instruction unit 62.

When the timer count value does not reach the power saving mode change timer count value and it is recognized that the image processing of the next job (new job) has been performed on the basis of the image processing condition information from the image processing condition recognizing unit 50, the determining unit 58 instructs the timer management unit 52 to stop the timer counting operation.

When the timer count value does not reach the power saving mode change timer count value and it is not recognized that image processing has been performed on the basis of the image processing condition information, the determining unit 58 continuously performs the timer counting operation.

The timer management unit 52 is connected to a power saving mode change timer count value update unit 64. The image processing condition recognizing unit 50 is connected to the power saving mode change timer count value update unit 64.

When information when the timer counting operation is stopped is input from the timer management unit 52 and image processed information is input from the image processing condition recognizing unit 50, the power saving mode change timer count value update unit 64 sets the optimal stage among the stages 1 to 5 shown in FIG. 4 on the basis of the timer count value at that time.

The power saving mode change timer count value (stage) update unit 64 is connected to a stage-timer count value table memory 66, reads a timer count value corresponding to the set stage from the stage-timer count value table memory 66, and updates the timer count value stored in the power saving mode change timer count value memory 58.

(Control of Sensitivity of Motion Sensor)

The power saving mode returns to the power supply mode when the motion sensor 28 detects that the person approaches the image processing apparatus 10. The detection state of the motion sensor 28 is monitored by the power saving monitoring controller 24.

When the operation mode needs to be changed to the power supply mode, the power saving monitoring controller 24 instructs the power supply control circuit 252 to change the operation mode to the power supply mode.

The power saving monitoring controller 24 is connected to a return process condition analyzer 68. The return process condition analyzer 68 receives a power supply mode change signal from the power saving monitoring controller 24 when the operation mode is changed to the power supply mode. The return process condition analyzer 68 is connected to the image processing condition recognizing unit 50 and acquires the image processing condition information of each device. In addition, the return process condition analyzer 68 is connected to the power saving mode change instruction unit 60 and acquires a power saving mode change signal when the operation mode is changed to the power saving mode.

Therefore, the return process condition analyzer 68 determines whether there is an operation during the period from the returning of the operation mode to the power supply mode by the motion sensor 28 to a change to the next power saving mode (including the operation of the UI touch panel 216 or the operation of a hard key including the power saving cancellation button 26).

The analysis result of the return process condition analyzer 68 is transmitted to a motion sensor sensitivity (stage) determining unit 70. The motion sensor sensitivity (stage) determining unit 70 is connected to a stage-motion sensor sensitivity table memory 72, reads sensitivity corresponding to a determined stage, and transmits the read sensitivity to the power saving monitoring controller 24. The power saving monitoring controller 24 outputs an instruction to adjust sensitivity to the circuit board unit 28B of the motion sensor 28.

In this exemplary embodiment which performs the stage setting control of the sensitivity of the motion sensor 28 and the power saving mode change timer count value, the sensitivity of the motion sensor 28 is changed in operative association with a change in the stage of the power saving mode change timer count value (see the indexes of the stages 1 to 5 in FIG. 4). For example, when the power saving mode change timer count value increases, convenience is improved by a value corresponding to the increase in the count value, but the energy saving performance is reduced. When the sensitivity of the motion sensor 28 is reduced, the convenience is reduced, but the reduction in the energy saving performance is supplemented. When the power saving mode change timer count value is reduced, the energy saving performance is improved by a value corresponding to the reduction in the count value, but the convenience is reduced. When the sensitivity of the motion sensor 28 increases, the energy saving performance is reduced, but the reduction in the convenience is supplemented.

On the other hand, in this exemplary embodiment that performs the stage setting control of the sensitivity of the motion sensor 28 and the power saving mode change timer count value, the stage of the power saving mode change timer count value is changed in operative association with a change in the sensitivity of the motion sensor 28 (see the indexes of the stages 1 to 5 in FIG. 4). For example, when the sensitivity of the motion sensor 28 is reduced, the energy saving performance is improved by a value corresponding to the reduction in the sensitivity, but the convenience is reduced. When the power saving mode change timer count value increases, the energy saving performance is reduced, but the reduction in the convenience is supplemented. On the other hand, when the sensitivity of the motion sensor 28 increases, the convenience is improved by a value corresponding to the increase in the sensitivity, but the energy saving performance is reduced. When the power saving mode change timer count value is reduced, the convenience is reduced, but the reduction in the energy saving performance is supplemented.

Next, the operation of this exemplary embodiment will be described.

In the image processing apparatus 10 according to this exemplary embodiment, when predetermined conditions are satisfied, the operation mode is changed to the power saving mode. The power saving mode cuts the supply of power to the main controller 200 and the UI touch panel 216 other than the power saving monitoring controller 24, in addition to the supply of power to the facsimile communication control circuit 236, the image reading unit 238, and the image forming unit 240. In this case, the function of the power saving cancellation button 26 connected to the main controller 200 is stopped. Therefore, the image processing apparatus 10 is in the same state as that in which the main power supply switch is completely turned off, as viewed from the surroundings. That is, it is possible to reliably check that the power saving mode is performed in the vicinity of the image processing apparatus ("visualization").

Figure 6:
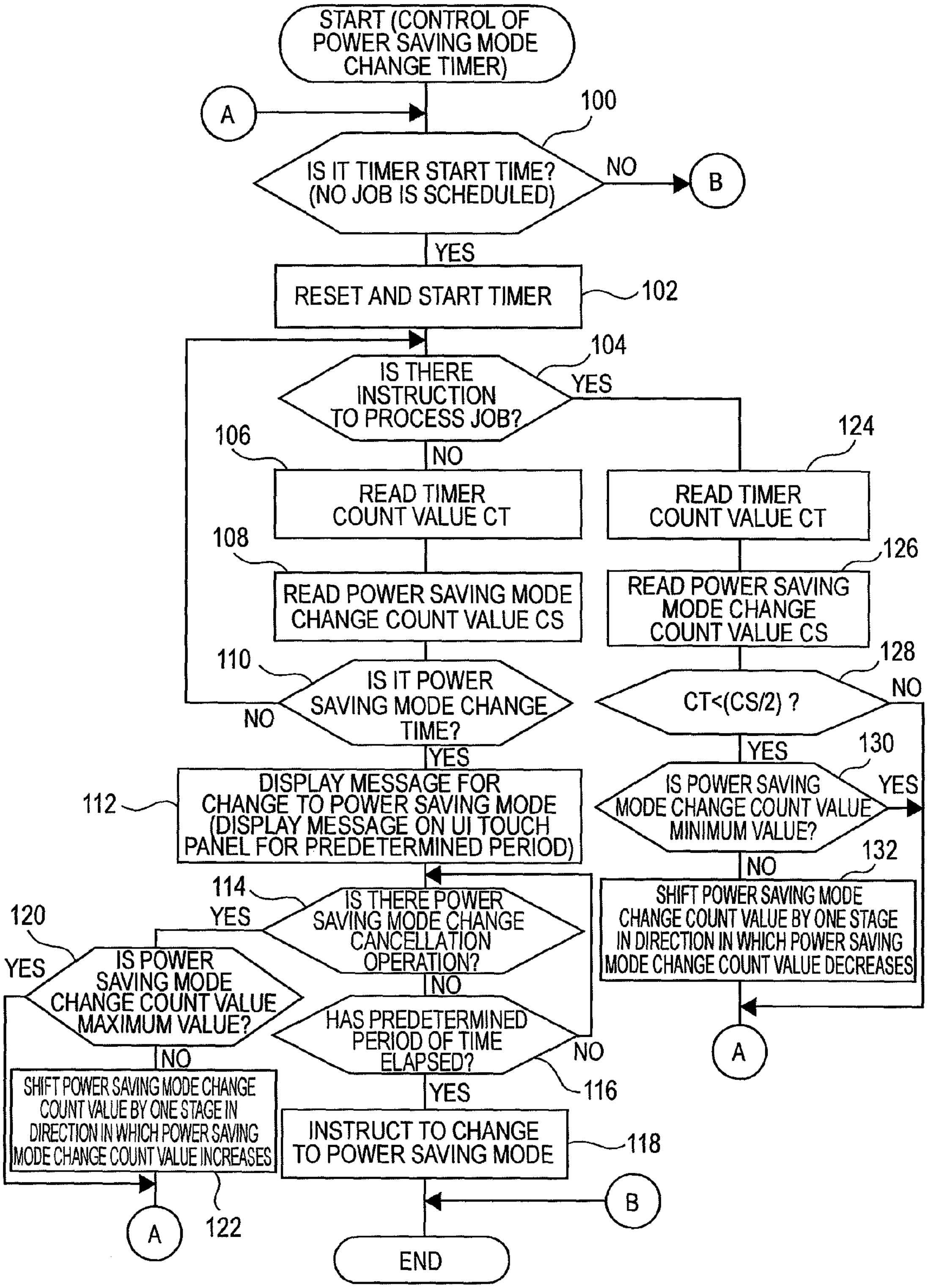
FIG. 6 is a flowchart illustrating a power saving mode change timer control routine according to this exemplary embodiment.

FIG. 6 is a flowchart illustrating the flow of the control of the power saving mode change timer.

First, in Step 100, it is determined whether it is a timer starting time. For example, when a series of jobs ends and there is no job that is scheduled, the timer may start up.

When the determination result in Step 100 is "No", it is determined that it is not the time to start the power saving mode change timer and the routine ends.

When the determination result in Step 100 is "Yes", it is determined that it is the time to start the power saving mode change timer, and the process proceeds to Step 102 to reset/start the timer 54 (see FIG. 5).

In Step 104, it is determined whether there is an instruction to perform the next job. When the determination result is "No", the process proceeds to Step 106 and the current timer count value CT is read. Then, the process proceeds to Step 108, and the power saving mode change timer count value CS is read from the power saving mode change timer count value memory 58. Then, the process proceeds to Step 110.

In Step 110, it is determined whether it is the time to change the operation mode to the power saving mode. When the determination result in Step 110 is "No", the process returns to Step 104. When the determination result in Step 110 is "Yes", the process proceeds to Step 112 and a message for changing to the power saving mode is displayed on the UI touch panel 216 (see FIG. 2) for a predetermined period of time. Then, the process proceeds to Step 114 and it is determined whether there is an operation for cancelling the change of the power saving mode.

When the determination result in Step 114 is "No", the process proceeds to Step 116 and it is determined whether a predetermined period of time has elapsed. When the determination result in Step 116 is "No", the process returns to Step 114. The predetermined period of time in Step 116 may be equal to or different from the predetermined period of time (the period of time for which the message is displayed on the UI touch panel 216) in Step 112.

When the determination result in Step 116 is "Yes", the process proceeds to Step 118 and an instruction to change the operation mode to the power saving mode is output. Then, the routine ends.

When the determination result in Step 114 is "Yes", the process proceeds to Step 120 and it is determined whether the power saving mode change timer count value is the maximum value. When the determination result is "No", the process proceeds to Step 122, the power saving mode change timer count value is shifted by one stage in the direction in which it increases. Then, the process proceeds to Step 100. That is, it is determined that it is too early to change the operation mode to the power saving mode at the current power saving mode change timer count value CS. The power saving mode change timer count value is increased and the next timer management is performed. When the determination result in Step 120 is "Yes", the process proceeds to Step 100 without performing adjustment since the stage is the maximum.

When the power saving mode change timer count value increases, the period for which the power supply mode is maintained increases. Therefore, convenience is improved, but the energy saving performance is reduced. In this exemplary embodiment, the stage of the motion sensor 28 is shifted by one in the direction in which sensitivity is reduced in operative association with the shift of the stage of the power saving mode change timer count value, and the period for which the power saving mode is maintained increases, thereby supplementing the reduction in the energy saving performance.

When Steps 104, 106, 108, and 110 are repeatedly performed and the determination result in Step 104 is "Yes", the process proceeds to Step 124 and the current timer count value CT is read. Then, the process proceeds to Step 126, and the power saving mode change timer count value CS is read from the power saving mode change timer count value memory 58. Then, the process proceeds to Step 128

In Step 128, it is determined whether the current power saving mode change timer count value CS is appropriate. In this exemplary embodiment, CT is compared with (CS/2). As a result of the comparison, when it is determined that CT is less than (CS/2) (the determination result in Step 128 is "Yes"), the current power saving mode change timer count value CS is determined to be inappropriate. Then, the process proceeds to Step 130 and it is determined whether the power saving mode change timer count value is the minimum value. When the determination result in Step 130 is "No", the process proceeds to Step 132 and the power saving mode change timer count value is shifted by one stage in the direction in which it is reduced and the process proceeds to Step 100. That is, it is determined that it is too late to change the operation mode to the power saving mode at the current power saving mode change timer count value CS. Therefore, the power saving mode change timer count value is reduced and the next timer management is performed. When the determination result in Step 128 is "No" (it is determined that CT (CS/2) is satisfied), the current power saving mode change timer count value CS is determined to be appropriate and the process proceeds to Step 100. When the determination result in Step 130 is "Yes", the process proceeds to Step 100 without performing adjustment since the stage is the minimum.

When the power saving mode change timer count value is reduced, the period for which the power supply mode is maintained is reduced. Therefore, the energy saving performance is improved, but convenience is reduced. In this exemplary embodiment, the stage of the motion sensor 28 is shifted by one in the direction in which sensitivity is reduced in operative association with the shift of the stage of the power saving mode change timer count value, and the period for which the power saving mode is maintained is reduced, thereby supplementing the reduction in the convenience.

Figure 7:
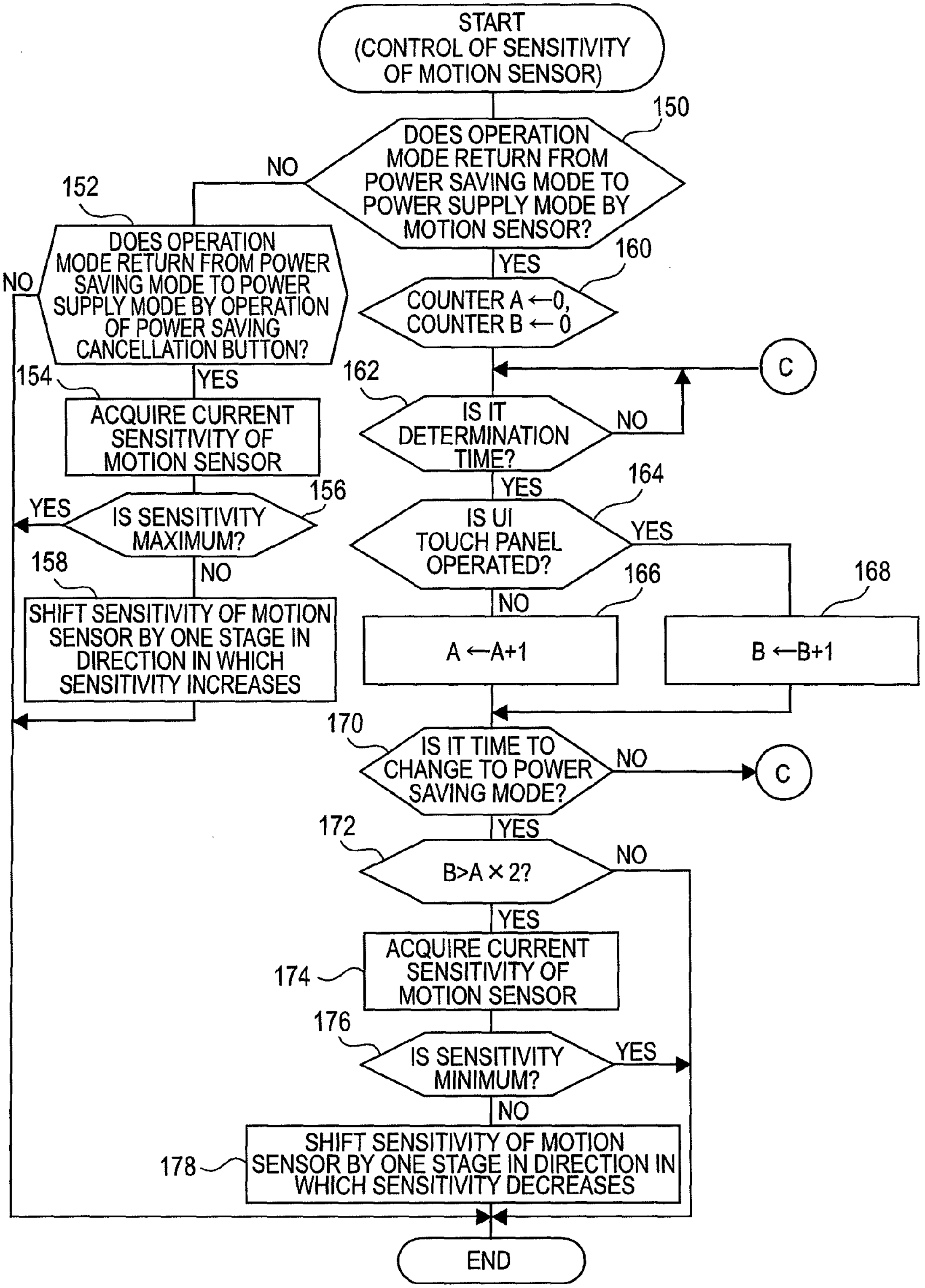
FIG. 7 is a flowchart illustrating a motion sensor sensitivity control routine according to this exemplary embodiment.

FIG. 7 is a flowchart illustrating the flow of the sensitivity control of the motion sensor. In the flowchart, it is preferable that the sensitivity control be performed when the operation mode is changed from the power saving mode to the power supply mode.

First, in Step 150, it is determined whether the power saving mode returns to the power supply mode by the motion sensor 28. When the determination result is "No", the process proceeds to Step 152 and it is determined whether the power saving mode returns to the power supply mode by the operation of the power saving cancellation button 26 (see FIG. 2). When the determination result in Step 152 is "No", the routine ends, for example, since the power supply is turned on.

When the determination result in Step 152 is "Yes", that is, when the power saving mode returns to the power supply mode by the operation of the power saving cancellation button 26, the process proceeds to Step 154 and the sensitivity (a stage value in FIG. 4) of the current motion sensor 28 is acquired. In Step 156, it is determined whether the acquired sensitivity is the maximum. When the determination result in Step 256 is "No", the process proceeds to Step 158 and the stage of the sensitivity of the motion sensor 28 is shifted by one in the direction in which the sensitivity increases and the routine ends. That is, the image processing apparatus determines that the impossibility of reliably recognizing the user who approaches the image processing apparatus in order to use it is high, at the current sensitivity of the motion sensor 28, and increases the sensitivity of the motion sensor 28. Then, the image processing apparatus performs the next moving body detecting process (person detecting process). When the determination result in Step 156 is "Yes", the routine ends without performing adjustment since the stage is the maximum.

When the sensitivity of the motion sensor 28 increases, the period for which the power saving mode is maintained is reduced. Therefore, convenience is improved, but the energy saving performance is reduced. In this exemplary embodiment, the power saving mode change timer count value is shifted by one stage so as to be reduced in operative association with the shift in the stage of the sensitivity of the motion sensor 28, and the period for which the power supply mode is maintained is reduced, thereby supplementing the reduction in the energy saving performance.

When the determination result in Step 150 is "Yes", that is, when the motion sensor 28 detects the person and the power saving mode returns to the power supply mode, the process returns to Step 160 and a counter A and a counter B are reset (0). Then, the process proceeds to Step 162.

In Step 162, it is determined whether it is a predetermined fixed determination time. When the determination result is "Yes", the process proceeds to Step 164 and it is determined whether the UI touch panel 216 (see FIG. 2) is operated. When the determination result is "Yes" (when it is determined that the UI touch panel 216 is operated), the counter A increases (A←A+1) in Step 166. When the determination result is "No" (when it is determined that the UI touch panel 216 is not operated), the counter B increases (B←B+1) in Step 168. Then, the process proceeds to Step 170.

In Step 170, it is determined whether it is the time to change the operation mode to the power saving mode. When the determination result is "No", the process returns to Step 162.

When the determination result in Step 170 is "Yes", the process proceeds to Step 172 and the count value of the counter A is compared with the count value of the counter B. In this exemplary embodiment, the counter A having a weight given thereto is compared with the counter B (B: (A×2)).

When it is determined in Step 172 that B>(A×2) is satisfied, the process proceeds to Step 174 and the sensitivity (the stage value in FIG. 4) of the current motion sensor 28 is acquired. Then, in Step 176, it is determined whether the acquired sensitivity is the minimum. When the determination result in Step 176 is "No", the process proceeds to Step 178 and the sensitivity of the motion sensor 28 is shifted by one stage in the direction in which it is reduced and the routine ends. That is, the image processing apparatus determines that the frequency of use is likely to be low even when the person is detected and the operation mode is changed to the power supply mode, at the current sensitivity of the motion sensor 28. Therefore, the image processing apparatus reduces the sensitivity of the motion sensor 28 and performs the next moving body detecting process (person detecting process). If the determination result in Step 172 is "No", the routine ends without performing adjustment since the frequency of use is high when the person is detected and the operation mode is changed to the power supply mode. When the determination result in Step 176 is "Yes", the routine ends without performing adjustment since the stage is the minimum.

When the sensitivity of the motion sensor 28 is reduced, the period for which the power saving mode is maintained increases. Therefore, the energy saving performance is improved, but convenience is reduced. In this exemplary embodiment, the power saving mode change timer count value is shifted by one stage so as to increase, in operative association with the shift in the stage of the sensitivity of the motion sensor 28 and the period for which the power supply mode is maintained increases, thereby supplementing the reduction in the convenience.

Figure 8A:
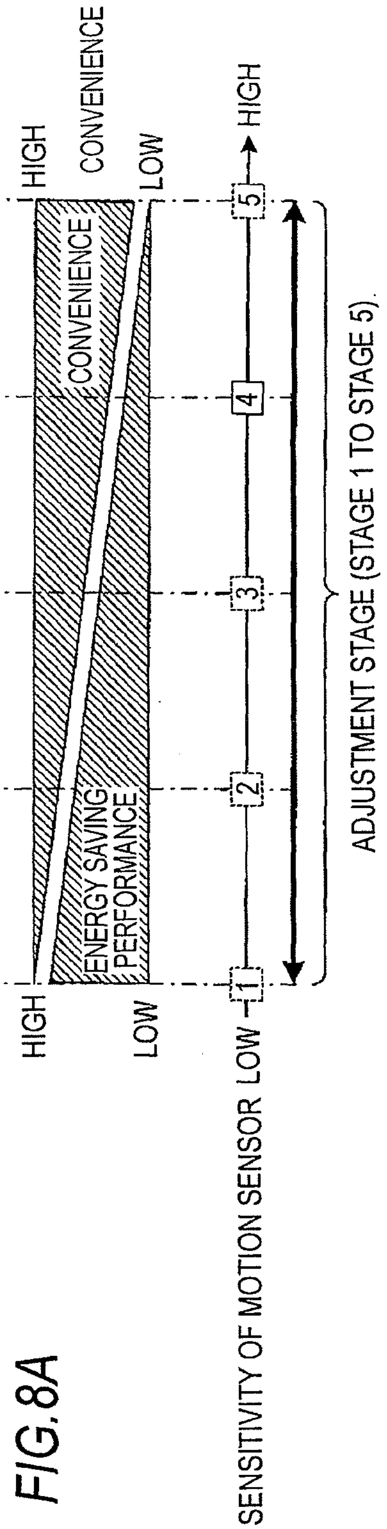
FIGS. 8A and 8B are conceptual diagrams illustrating the adjustment stages of the sensitivity of a motion sensor and a power saving change timer for achieving both energy saving performance and convenience of an image processing apparatus according to a modification.
Figure 8B:
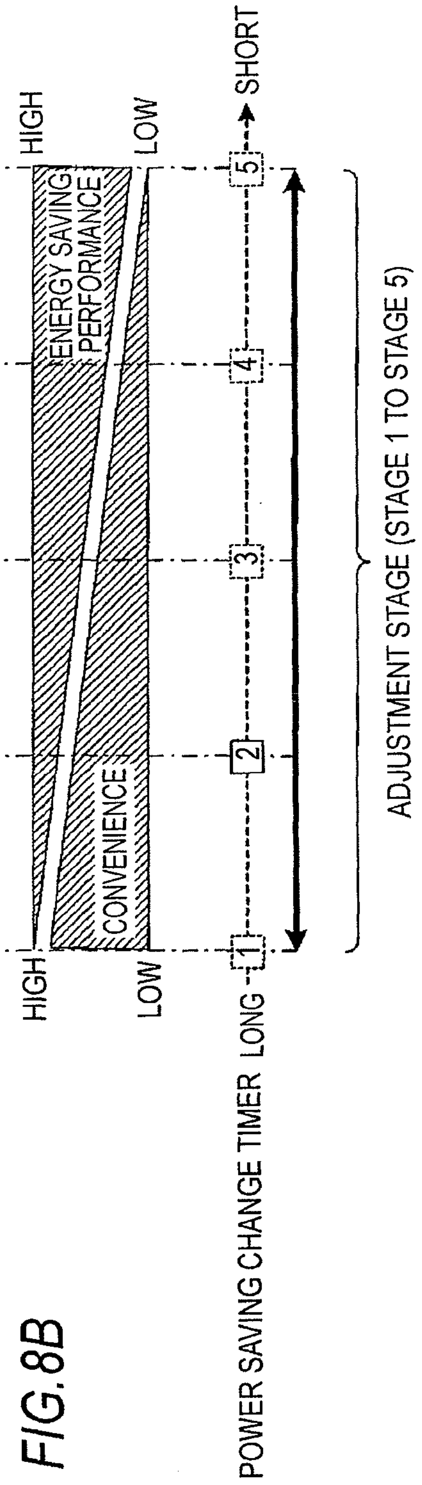

In this exemplary embodiment, when the stage is set, as shown in FIG. 4, the adjustment of the sensitivity of the motion sensor 28 is operatively associated with the adjustment of the power saving mode change timer count value CS. For example, when one of the sensitivity and the power saving mode change timer count value is adjusted and the energy saving performance is reduced, the other is adjusted to supplement the reduction. However, as shown in FIGS. 8A and 8B, the stage of the sensitivity of the motion sensor 28 and the stage of the power saving mode change timer count value CS may be independently adjusted.

Figure 9:
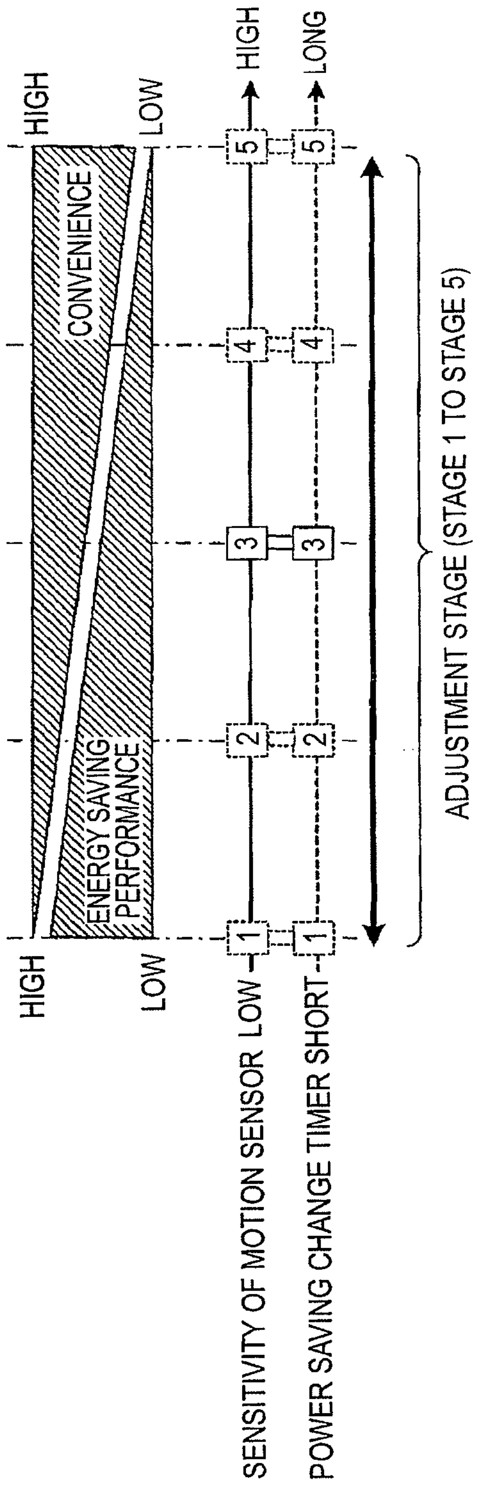
FIG. 9 is a conceptual diagram illustrating the adjustment stages of the sensitivity of a motion sensor and a power saving change timer for selectively improving energy saving performance and convenience of an image processing apparatus according to a modification.

In this exemplary embodiment, when the stages are adjusted in operative association with each other, the sensitivity of the motion sensor and the power saving change timer count value are combined such that the energy saving performance and the convenience are contrary to each other. However, the sensitivity of the motion sensor and the power saving change timer count value are adjusted in operative association with each other for the same purpose. That is, as shown in FIG. 9, when the sensitivity of the motion sensor is low, the power saving change timer count value may be set to the stage 1 where the power saving change timer count value is small. When the sensitivity of the motion sensor is high, the power saving change timer count value may be set to the stage 5 where the power saving change timer count value is large. In this way, whichever of energy saving performance or convenience is sacrificed, the one remaining of either energy saving performance or convenience is significantly improved.

The number of "stages" is not limited to 5, but there is no limit in the number of stages. That is, setting is not limited to discontinuous setting, but the number of "stages" may indefinitely increase, that is, continuous adjustment may be performed.

In this exemplary embodiment, both the sensitivity of the motion sensor 28 and the power saving mode change timer count value are adjusted. However, only the sensitivity of the motion sensor 28 (control according to the flowchart shown in FIG. 7) may be adjusted.

In this exemplary embodiment, power (power used to start the power saving monitoring controller 24) for the power saving mode is supplied from the mains power source 242. However, the apparatus maybe operated by power from an internal battery, a solar cell, or a rechargeable battery that is charged in the power supply mode. In this case, the supply of power from the mains power source 242 is completely cut in the power saving mode.

In FIG. 2, power is independently supplied to the devices (for example, the facsimile communication control circuit 236, the image reading unit 238, the image forming unit 240, some components of the main controller 200, and the UI touch panel 216) required for each instructed processing function, or the supply of power to the devices is independently cut. However, for example, power may be supplied to all of the devices in the power supply mode and power maybe supplied only to at least the motion sensor 28 and a monitoring control system thereof (power saving monitoring controller 24) in the power saving mode.

In this exemplary embodiment, as shown in FIGS. 6 and 7, the stages are updated on the basis of the history, such as the use conditions, of the image processing apparatus 10. However, the user may manually set the stages. After the user manually sets the stages, the stages may be fixed. That is, when the stages are set so as to be suitable for a user's taste, the user does not feel a sense of incongruity.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention is defined by the following claims and their equivalents.

What is claimed is:

1. A power supply control device comprising:

a power supply controller that selectively performs a power supply mode that receives power from a main power source and supplies power to a processor which is operated by the power and a power saving mode that stops the supply of power to the processor;

a detector that detects a moving body in a predetermined range in the vicinity of the processor;

a power supply mode change instruction unit that controls the power supply controller to change an operation mode from the power saving mode to the power supply mode when the detector detects the moving body;

an information history unit that acquires information related to an operation for the processor in the power supply mode;

a sensitivity adjusting unit that adjusts a detection sensitivity of the detector for the moving body on the basis of the information acquired by the information history unit for a period from a change of the operation mode from the power saving mode to the power supply mode to a change of the operation mode to a next power saving mode, a timer unit that measures a period for which no process is scheduled and no process is processed by the processor in the power supply mode;

a power saving mode change instruction unit that controls the power supply controller to change the operation mode from the power supply mode to the power saving mode when a count value of the timer unit is a predetermined reference value, which is a standard for changing the operation mode to the power saving mode;

a power saving mode cancellation unit that is valid in the power saving mode and is operated to input an instruction to change the operation mode from the power saving mode to the power supply mode; and a reference value adjusting unit that adjusts the reference value on the basis of the operation of the power saving mode cancellation unit.

2. The power supply control device according to claim 1, wherein, when the sensitivity adjusting unit adjusts the sensitivity of the detector to increase, the reference value adjusting unit adjusts the reference value to be reduced, the time required to change the operation mode to the power saving mode is reduced, and a reduction in an energy saving performance due to the increase in the sensitivity is supplemented, when the sensitivity adjusting unit adjusts the sensitivity of the detector to be reduced, the reference value adjusting unit adjusts the reference value to increase, the time required to change the operation mode to the power saving mode increases, and a reduction in convenience due to the reduction in the sensitivity is supplemented, and the adjustment of the sensitivity and the adjustment of the reference value are controlled in operative association with each other.

3. An image processing apparatus comprising:

the power supply control device according to claim 1; and at least one of an image reading unit that reads an image from a document image, an image forming unit that forms an image on a recording sheet on the basis of image information, and a facsimile communication controller that transmits an image to a destination according to a predetermined communication procedure, wherein the image reading unit, the image forming unit, and the facsimile communication controller perform image processing functions including an image reading function, an image forming function, an image copy function, a facsimile receiving function, and a facsimile transmitting function instructed by a user in cooperation with each other.

4. A non-transitory computer readable medium storing a program causing a computer to execute a process for controlling power supply, the process comprising:

selectively performing a power supply mode that receives power and supplies power to a processor which is operated by the power and a power saving mode that stops the supply of power to the processor;

detecting a moving body including in a predetermined range in the vicinity of the processor;

changing an operation mode from the power saving mode to the power supply mode upon detecting the moving body;

acquiring information related to an operation for the processor in the power supply mode;

adjusting a detection sensitivity for the moving body on the basis of the information acquired by the information acquiring step for a period from a change of the operation mode from the power saving mode to the power supply mode to a change of the operation mode to a next power saving mode;

measuring, with a timer, a period for which no process is scheduled and no process is processed by the processor in the power supply mode;

changing the operation mode from the power supply mode to the power saving mode when a count value of the timer is a predetermined reference value, which is a standard for changing the operation mode to the power saving mode;

inputting, by a power saving mode cancellation unit, an instruction to change the operation mode from the power saving mode to the power supply mode; and adjusting the reference value on the basis of the operation of the power saving mode cancellation unit.

5. An image processing apparatus comprising:

the power supply control device according to claim 1; and at least one of an image reading unit that reads an image from a document image, an image forming unit that forms an image on a recording sheet on the basis of image information, and a facsimile communication controller that transmits an image to a destination according to a predetermined communication procedure, wherein the image reading unit, the image forming unit, and the facsimile communication controller perform image processing functions including an image reading function, an image forming function, an image copy function, a facsimile receiving function, and a facsimile transmitting function instructed by a user in cooperation with each other.

6. An image processing apparatus comprising:

the power supply control device according to claim 2; and at least one of an image reading unit that reads an image from a document image, an image forming unit that forms an image on a recording sheet on the basis of image information, and a facsimile communication controller that transmits an image to a destination according to a predetermined communication procedure, wherein the image reading unit, the image forming unit, and the facsimile communication controller perform image processing functions including an image reading function, an image forming function, an image copy function, a facsimile receiving function, and a facsimile transmitting function instructed by a user in cooperation with each other.

* * * * *